No. 692,464. Patented Feb. 4, 1902.
D. MACKENZIE.
COMBINED BABY CARRIAGE AND SLEIGH.
(Application filed May 4, 1901.)
(No Model.)

Witnesses

Inventor

UNITED STATES PATENT OFFICE.

DANIEL MACKENZIE, OF OWEN SOUND, CANADA.

COMBINED BABY CARRIAGE AND SLEIGH.

SPECIFICATION forming part of Letters Patent No. 692,464, dated February 4, 1902.

Application filed May 4, 1901. Serial No. 58,825. (No model.)

*To all whom it may concern:*

Be it known that I, DANIEL MACKENZIE, of Owen Sound, in the county of Grey and Province of Ontario, Canada, have invented certain new and useful Improvements in a Combined Baby Carriage and Sleigh; and I hereby declare that the following is a full, clear, and exact description of the same.

This invention relates to a combined baby carriage and sleigh, and it relates more particularly to the peculiar construction of the running-gear and the manner in which it can be changed from wheels to runners, and vice versa, the object of the invention being to so arrange the various parts that they can be simply and cheaply manufactured and easily adjusted, a further object of the invention being to provide the shoe member of each runner with upturned front and heel members integrally formed with the shoe member, each of which after providing bearings for the brackets terminates in a downwardly-directed brace fastened to the top of the shoe member, approximately at or about the middle of the same, so that not only will the front and heel members be firmly braced against the downward pressure of the load, but the load will be evenly distributed on the heel, middle, and front of the shoe member, as hereinafter more fully set forth and more particularly pointed out in the claims.

Figure 1:
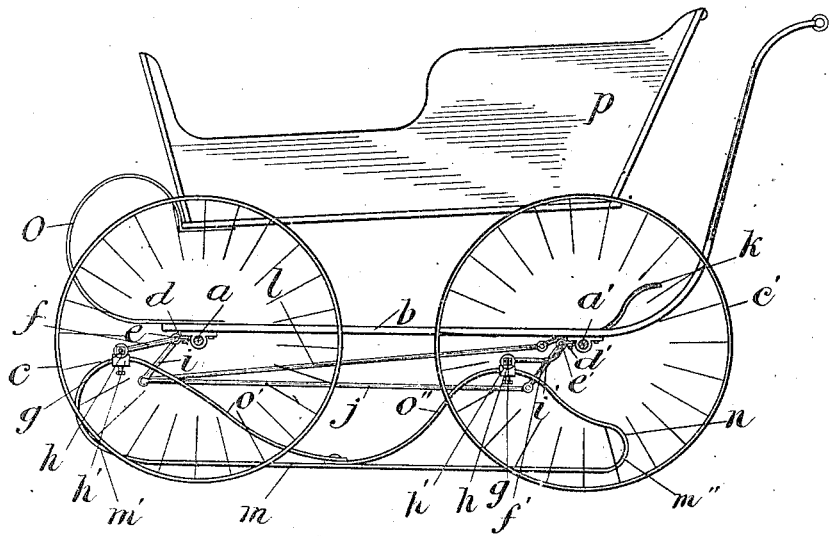
Figure 2:
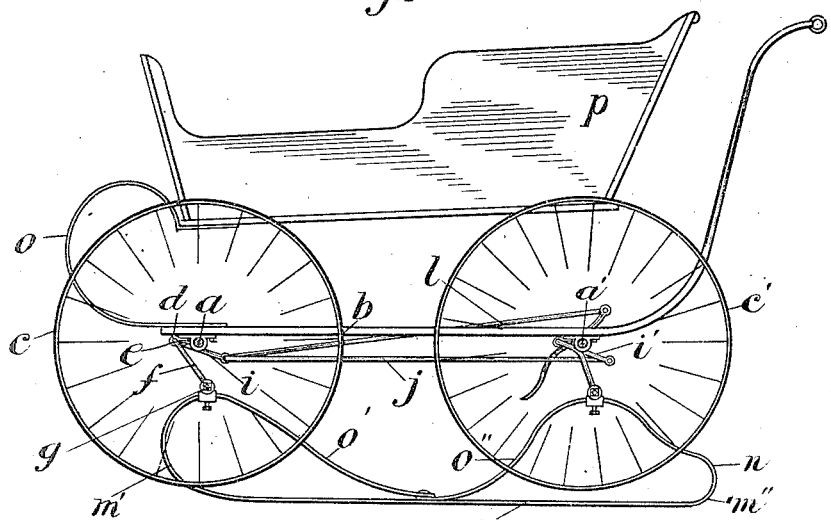
Figure 3:
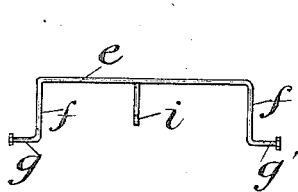
Figure 5:
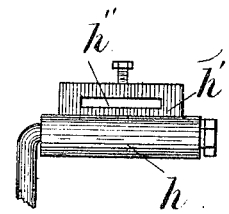
Figure 4:
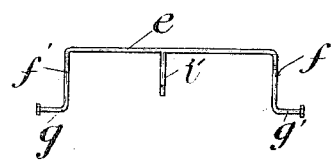

In the drawings, Figure 1 is a side elevation of the combined baby carriage and sleigh, showing the wheels in contact with the ground and the runners raised therefrom. Fig. 2 is a similar view showing the runners lowered into contact with the ground and the wheels raised therefrom. Figs. 3 and 4 are views of the front and rear cranked axles, respectively. Fig. 5 is a view of one of the brackets for securing the runners to the cranked axles.

Like letters of reference refer to like parts throughout the specification and drawings.

$a$ and $a'$ represent the front and rear axles, respectively, of the baby-carriage, rigidly connected to the side bars $b$, and mounted upon the arms of the axles $a$ and $a'$ are the front and rear ground-wheels $c$ and $c'$, respectively. Fitted to the side bars $b$ slightly in advance of the front axle $e$ are bearings $d$, in which is journaled a shaft $e$, terminating at each end in a crank $f$, arranged approximately at right angles to the shaft, each crank having an outwardly-directed arm $g$ parallel with the shaft $e$. Mounted on the side bars $b$ slightly in front of the rear axle $a'$ are similar bearings $d'$, in which is journaled a shaft $e'$, terminating at each end in a crank $f'$, arranged approximately at right angles to the shaft $e'$, each crank having an outwardly-directed arm $g'$. Loosely mounted upon the arms $g$ and $g'$ are the sleeves $h$ of the brackets $h'$. Formed in each bracket $h'$ is a slot $h''$, through which passes its respective runner in its adjusted position. Each of the runners $h^3$ consists of a shoe member $m$, a rounded front member $m'$, and a cranked heel member $m''$, integrally formed with the shoe member $m$. Securely fastened to the top of the rounded front member $m'$ and to the top of the heel member $m''$ are the brackets $h'$. In order to firmly brace the brackets against downward pressure, the rounded front member after providing a bearing for its respective bracket terminates in a brace $o'$, extending downwardly from the bracket $h'$ to the middle of the shoe, while the heel member is provided with a similar brace $o''$, extending downwardly from its respective bracket $h'$ to the middle of the shoe, the lower ends of the braces being preferably riveted or otherwise fastened to the shoe member. By means of the braces $o'$ and $o''$ the load is evenly distributed to the middle, front, and heel parts of the shoe, and in addition to the even distribution of the load the tops of the front and heel members are firmly braced against the downward pressure of the load.

Integrally formed with or rigidly connected to the shafts $e$ and $e'$ are levers $i$ and $i'$, respectively, and pivotally connected to the levers $i$ and $i'$ is a link $j$. Revolubly mounted on the rear axle $a'$ is a foot-lever $k$, and pivotally connected to one end of the foot-lever $k$ and to the lever $i$ is a connecting-rod $l$. By turning the foot-lever $k$ into the position shown in Fig. 1 of the drawings the lever $i$ is thrown forward by the connecting-rod $l$, causing a forward rotation of the shaft $e'$ and cranks $f$. The movement of the shaft $e'$ and crank $f$ causes by means of the levers $i$ and $i'$ and link $j$ a corresponding rotation of the shaft $e'$ and cranks $f'$, lifting the runners $h$ from the ground and bringing the ground-wheels into contact therewith. By turning the foot-lever *k* into the position shown in Fig. 2 of the drawings the movement of the levers and cranks is reversed, which reverse movement lowers the runners into contact with the ground and at the same time raises the wheels therefrom. By means of this device the apparatus can be converted from a sleigh into a carriage or from a carriage into a sleigh easily and without the displacement of any part of the vehicle. Connected to the side bars *b* are springs *o*, upon which is supported the body *p*. It is possible to vary the construction of the body-gear without departing from the nature of the invention.

Having thus fully described my invention, what I claim as new, and desire to secure by Letters Patent, is—

1. In a combined baby carriage and sleigh the ground-wheels, axles for the ground-wheels, side bars supported upon the axles between the ground-wheels, springs connected to the side bars, and a body supported by the springs, in combination with bearings connected to the side bars contiguous to the axles of the ground-wheels, crank-shafts journaled in the bearings parallel with the axles, axle-arms for the ends of the crank-shafts, sleeves rotatably mounted on the axle-arms, pendent lugs integrally formed with the rotatable sleeves, slots formed in the pendent lugs, runners, the tops of which pass through the slots, set-screws passing through the lugs to bind the runners in the slots, levers connected to the crank-shafts, a link connecting the levers, an operating-lever to adjust the position of the runners and a connecting-rod connected to the operating-lever and lever of the front crank-shaft, substantially as specified.

2. In a combined baby carriage and sleigh the ground-wheels, axles for the ground-wheels, side bars supported upon the axles between the ground-wheels, springs connected to the side bars, and a body supported by the springs, in combination with bearings connected to the side bars contiguous to the axles of the ground-wheels, crank-shafts journaled in the bearings parallel with the axles, axle-arms for the ends of the crank-shafts, sleeves rotatably mounted on the axle-arms, pendent lugs integrally formed with the rotatable sleeves, slots formed in the pendent lugs, runners each consisting of a shoe member and upturned front and heel members integrally formed with the shoe member passing through the slots in the pendent lugs forming the supports for the bearings and terminating in downwardly-directed braces connected to the upper side of the shoe member, set-screws passing through the lugs to bind the runners in their respective slots, levers connected to the ground-shafts, a link connecting the levers, an operating-lever to adjust the position of the levers and a connecting-rod connected to the operating-lever and to the lever of the front crank-shaft, substantially as specified.

Toronto, April 26, 1901.

DANIEL MACKENZIE.

In presence of—
C. H. RICHES,
L. F. BROCK.